(12) United States Patent  
Lumb et al.

(10) Patent No.: US 12,497,358 B2  
(45) Date of Patent: Dec. 16, 2025

(54) INHIBITOR OF EIF2α DEPHOSPHORYLATION

(71) Applicant: THE ROYAL INSTITUTION FOR THE ADVANCEMENT OF LEARNING/MCGILL UNIVERSITY, Montréal (CA)

(72) Inventors: Jean-Philip Lumb, Montréal (CA); Colin Crist, Montréal (CA)

(73) Assignee: THE ROYAL INSTITUTION FOR THE ADVANCEMENT OF LEARNING/MCGILL UNIVERSITY, Montréal (CA)

( * ) Notice: Subject to any disclaimer, the term of this patent is extended or adjusted under 35 U.S.C. 154(b) by 866 days.

(21) Appl. No.: 17/693,620

(22) Filed: Mar. 14, 2022

(65) Prior Publication Data

US 2022/0306575 A1  Sep. 29, 2022

Related U.S. Application Data

(60) Provisional application No. 63/162,186, filed on Mar. 17, 2021.

(51) Int. Cl.
  *C07C 335/02* (2006.01)
  *A61P 21/00* (2006.01)
  (Continued)

(52) U.S. Cl.
  CPC ............ *C07C 335/02* (2013.01); *A61P 21/00* (2018.01); *C07C 335/16* (2013.01); *C12N 5/0659* (2013.01)

(58) Field of Classification Search
  None
  See application file for complete search history.

(56) References Cited

U.S. PATENT DOCUMENTS

2016/0311767 A1 * 10/2016 Zhong .................. C07C 391/00

OTHER PUBLICATIONS

Westphal ("Evaluation of tert-Butyl Isosteres: Case Studies of Physicochemical and Pharmacokinetic Properties, Efficacies, and Activities" ChemMedChem, 2015, p. 461) (Year: 2015).*

(Continued)

*Primary Examiner* — Amy C Bonaparte
(74) *Attorney, Agent, or Firm* — Christian Cawthorn; NORTON ROSE FULBRIGHT CANADA LLP

(57) ABSTRACT

The present disclosure relates to a compound of formula (I)

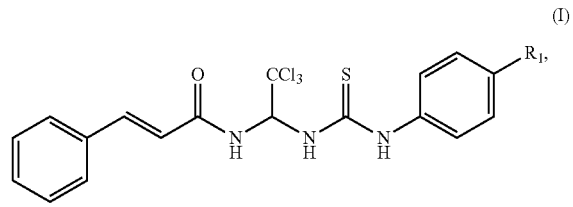

where $R_1$ is as defined herein. The compound of formula I is an inhibitor of the dephosphorylation of phosphorylated elF2α. The phosphorylation of elF2α affects the quiescence and self renewal properties of stem cells such as muscle stem cells. The compound of formula (I) can thus be used to expand stem cells populations and treat degenerative diseases that have a quiescence regulation affected or mediated by the phosphorylation of elF2α.

19 Claims, 17 Drawing Sheets

(51) Int. Cl.
*C07C 335/16* (2006.01)
*C12N 5/077* (2010.01)

(56) References Cited

OTHER PUBLICATIONS

Lean, G. et al.: "Ex vivo Expansion of Skeletal Muscle Stem Cells with a Novel Small Compound Inhibitor of eIF2α Dephosphorylation". Regen Med Front, 2019; 1:e190003.
Zismanov et al.: "Phosphorylation of eIF2a Is a Translational Control Mechanism Regulating Muscle Stem Cell Quiescence and Self-Renewal". Cell Stem Cell 18, 2016, pp. 79-90.

* cited by examiner

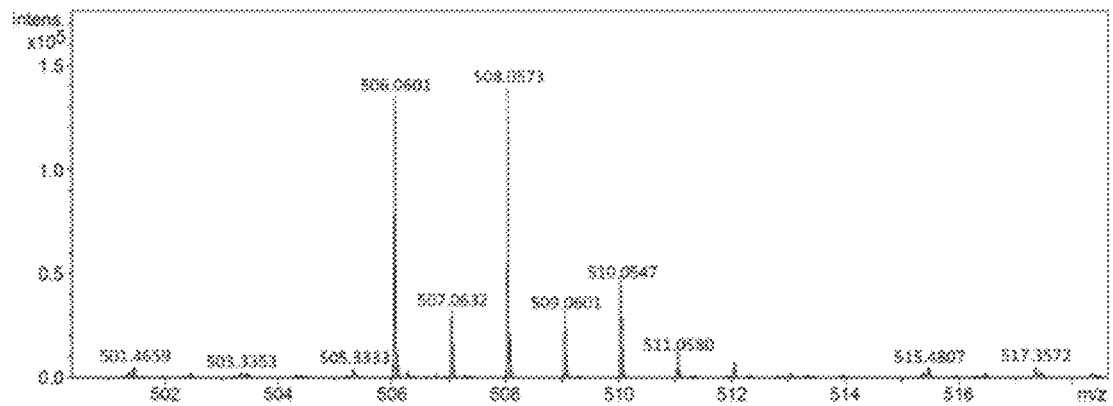
FIG. 4
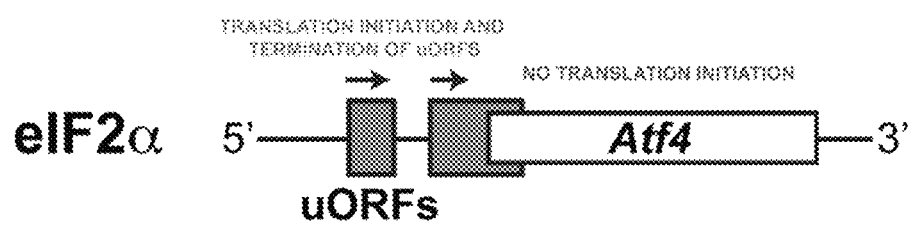
FIG. 5A
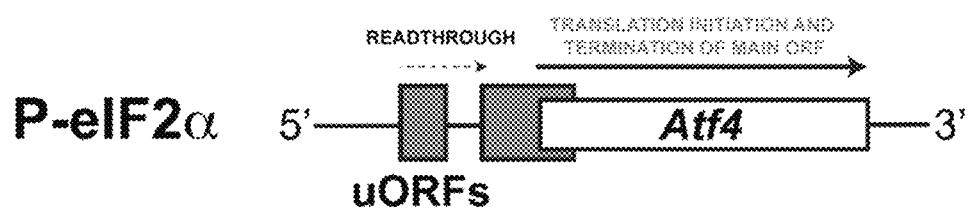
FIG. 5B
FIG. 5C

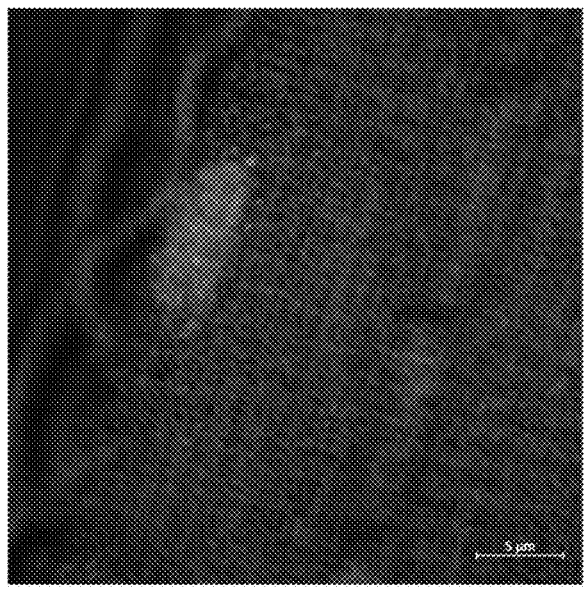 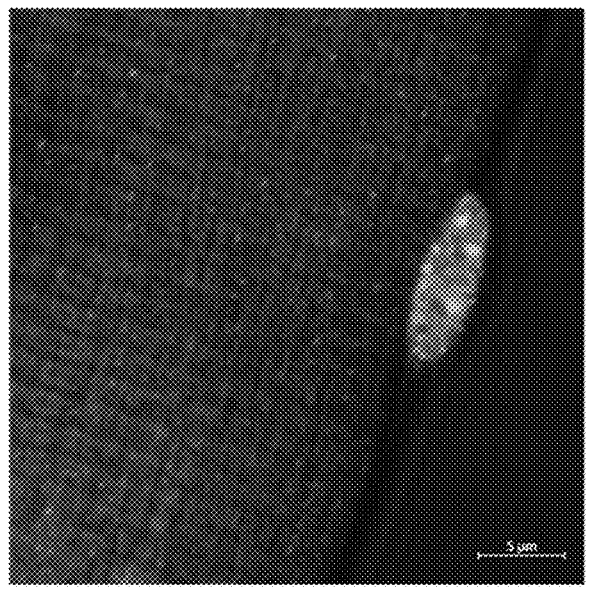
FIG. 21A  FIG. 21B
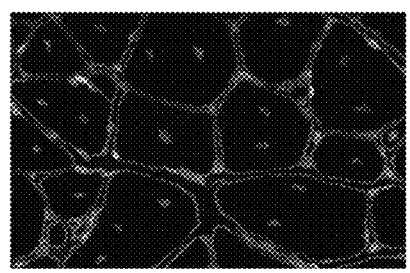
FIG. 22A
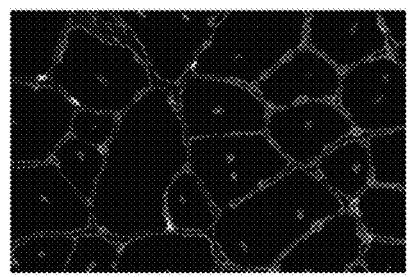
FIG. 22B

INHIBITOR OF EIF2α DEPHOSPHORYLATION

CROSS-REFERENCE TO RELATED APPLICATION

The present application claims benefit of U.S. Provisional Application No. 63/162,186 filed on Mar. 17, 2021, the content of which is hereby incorporated by reference in its entirety.

TECHNICAL FIELD

The present disclosure generally relates to the field of small compound inhibitors of the dephosphorylation of EIF2α.

BACKGROUND

Regenerative organs, such as the skin, intestinal tract, and skeletal muscles, use resident adult stem cells both to maintain lifelong tissue function and restore tissue function after acute or during chronic injury. Adult stem cells are operationally defined by their abilities to differentiate into the different cell types that make up the tissue and self-renew, which is required for lifelong maintenance of the stem cell population.

Despite the ability of stem cell dependent organ regeneration, these same regenerative tissues are nevertheless subject to degenerative diseases that have very limited therapeutic options. This issue is highlighted in skeletal muscle, where healthy individuals can undergo robust muscle stem cell (MuSC) dependent endogenous repair. Despite the capacity for regeneration, skeletal muscles are also subject to degenerative diseases such as muscular dystrophy, muscle wasting associated with comorbidity (cachexia), and aging (sarcopenia). The paradox of a regenerative organ being susceptible to degenerative diseases can be reconciled by recent studies revealing that disease progression is accompanied by a decline in stem cell numbers and function, resulting in the inability to perform endogenous repairs.

Known examples of small compound inhibitors include compounds Sal003 and C10 (Lean, G., Halloran, M., Mariscal, O., Jamet, S., Lumb, J. P., & Crist, C. Ex vivo expansion of skeletal muscle stem cells with a novel small compound inhibitor of eIF2α dephosphorylation. Regen Med Front, 2019; 1:e190003, herein referred to as Lean et al.). However, there is a need to improve the efficacy and/or efficiency of the inhibition to develop a therapeutic compound that targets the dephosphorylation of eIF2α.

SUMMARY

In one aspect there is provided a compound of formula (I)

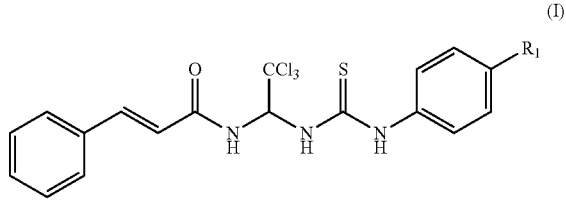

a hydrate and/or a pharmaceutical salt thereof, wherein $R_1$ is a hydrophobic group that brings bulkiness and rigidity, such as $C_3$-$C_8$ cycloalkyl or a tert-butyl. The cycloalkyl can be for example a $C_3$-$C_6$ cycloalkyl, preferably a $C_3$-$C_5$ cycloalkyl, and more preferably a cyclopropyl.

In one embodiment, there is provided compound of formula (Ia)

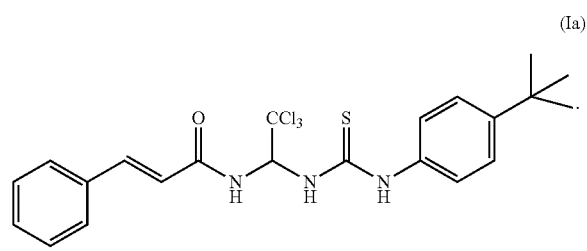

In one aspect, there is provided a pharmaceutical composition comprising the compound disclosed herein and a pharmaceutically acceptable excipient.

In one aspect, there is provided a media composition comprising the compound disclosed herein and a cell culture medium.

In one aspect, there is provided a method of treating a degenerative disease that has a stem cell quiescence regulation affected or mediated by the phosphorylation of eIF2α, the method comprising administering the compound or the pharmaceutical composition disclosed herein to a subject in need thereof.

In one aspect, there is provided a method of treating a degenerative disease comprising expanding a stem cell population that has a quiescence regulation affected or mediated by the phosphorylation of eIF2α, from a subject with the compound disclosed herein and grafting the stem cell population in the subject.

In one aspect, there is provided a method treating a degenerative disease comprising expanding a stem cell population that has a quiescence regulation affected or mediated by the phosphorylation of eIF2α, from a subject with the media composition disclosed herein and grafting the stem cell population into the subject.

In further aspects, the compound, the pharmaceutical composition or the media composition as disclosed herein can be used for the treatment of a degenerative disease that has a stem cell quiescence regulation affected or mediated by the phosphorylation of eIF2α.

In other aspects, the compound or the pharmaceutical composition as disclosed herein can be used in the manufacture of a medication for the treatment of a degenerative disease that has a stem cell quiescence regulation affected or mediated by the phosphorylation of eIF2α.

In another aspect, there is provided the use of the compound or the pharmaceutical composition disclosed herein for treating a degenerative disease that has a stem cell quiescence regulation affected or mediated by the phosphorylation of eIF2α.

In a further aspect, there is also provided the use of the compound or the pharmaceutical composition disclosed herein for the manufacture of a medication for the treatment a degenerative disease that has a stem cell quiescence regulation affected or mediated by the phosphorylation of eIF2α.

In some embodiments, the degenerative disease is a muscular degenerative disease and the stem cell population is a muscular stem cell population. Such muscular degenerative disease can be for example muscular dystrophy (such as Duchenne muscular dystrophy, Becker muscular dystrophy, a myotonic muscular dystrophy, a facioscapulohumeral muscular dystrophy (FSHD), a congenital muscular dystrophy, or a limb-girdle muscular dystrophy), cachexia or sarcopenia.

In one aspect, there is provided a method of expanding a satellite cell population in vivo using the compound or the media composition disclosed herein.

In one aspect, there is provided a method of expanding a satellite cell population ex vivo using the compound or the media composition disclosed herein.

Many further features and combinations thereof concerning the present improvements will appear to those skilled in the art following a reading of the instant disclosure.

DESCRIPTION OF THE DRAWINGS

FIG. 4 is the high-resolution mass spectrometry (HRMS) spectrum of compound C15 produced by an exemplary fabrication method.

FIG. 5A is a schematic diagram of the translation initiation of Atf4 in the presence of eIF2α.

FIG. 5B is a schematic diagram of the translation initiation of Atf4 in the presence of phosphorylated eIF2α (P-eIF2α).

FIG. 5C is a schematic diagram of the vector with Luc (luciferase) downstream of the upstream open reading frames (uORFs) of Atf4.

FIG. 21A is a microscopy image of single extensor digitorum longus (EDL) myofibers (with PAX7 stained green, DDX6 red and DAPI blue) after two weeks of in vivo exposure to C15 according to the schematic diagram of FIG. 16, with the DMSO:PEG400 control condition.

FIG. 21B is a microscopy image of single extensor digitorum longus (EDL) myofibers (with PAX7 stained green, DDX6 red and DAPI blue) after two weeks of in vivo exposure to C15 according to the schematic diagram of FIG. 16, with C15 treatment (14 days, 2.5 mg/kg/day).

FIG. 22A is a microscopy image of tibialis anterior (TA) Dmd$^{mdx}$ muscle stem cells (with PAX7 stained green, laminin red and DAPI blue) after two weeks of exposure to DMSO:PEG400 control condition.

FIG. 22B is a microscopy image of TA Dmdmdx muscle stem cells (with PAX7 stained green, laminin red and DAPI blue) after two weeks of in vivo exposure to C15 according to the schematic diagram of FIG. 16 (14 days, 2.5 mg/kg/day).

DETAILED DESCRIPTION

Figure 1:
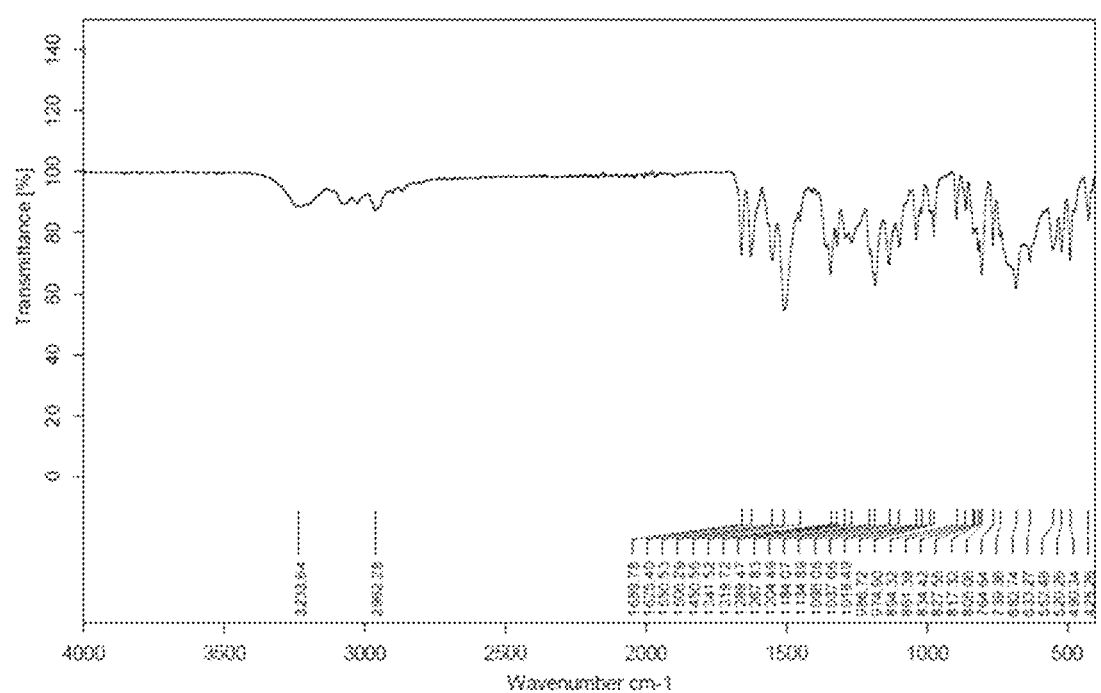
FIG. 1 is a Infrared (IR) spectrum of compound C15 produced by an exemplary fabrication method.

The present disclosure concerns a compound of formula (I), uses thereof, methods of using same, and methods of producing same.

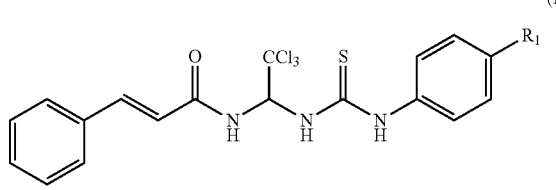

(I)

R$_1$ is a hydrophobic, bulky and rigid group. In one embodiment, R$_1$ is a C$_3$-C$_3$ cycloalkyl or a tert-butyl. The cycloalkyl can be for example a C$_3$-C$_6$ cycloalkyl, preferably a C$_3$-C$_5$ cycloalkyl, such as a cyclopropyl. In one embodiment, the compound is of formula (Ia) shown below.

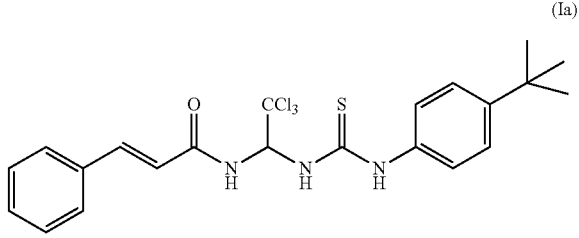

(Ia)

The compound of formula (Ia), herein referred to as compound C15, is a small molecule inhibitor of the dephosphorylation of phosphorylated elF2α(P-elF2α). The tricholoromethyl group of compound C15 is important for its activity.

A compound of formula (I) prevents the dephosphorylation of elF2α. elF2α is a translation initiation factor in eukaryotic cells. The phosphorylation of elF2α is relevant in muscle stem cells (satellite cells) to maintain low protein synthesis, retain quiescence and self-renewal capabilities. Thus by preventing the dephosphorylation of elF2α, the compound of formula (I) can maintain the satellite cell's regenerative capacity. The healthy satellite cells, which are mitotically quiescent somatic stem cells, are needed for the physiological regeneration activity of muscle fibers. In degenerative muscle diseases, satellite cells lose or have a reduced ability to self-renew and maintain a population of quiescent stem cells. By promoting an increase in the levels of P-elF2α(as opposed to elF2α), the compound of formula (I) improves the ability of satellite cells to self-renew. The molecular pathways of elF2α phosphorylation and dephosphorylation are explained in further detail in Lean et al., which is herein incorporated by reference. Although the present application presents details and data for muscle stem cells, the use of the compound of formula (I) is not limited to muscle stem cells and can also be applied on intestinal tract stem cells, skin stem cells, hematopoietic stem cells and any other stem cell types that have a quiescence regulation affected or mediated by the phosphorylation of elF2α.

Satellite cells require tightly regulated protein synthesis through the phosphorylation of elF2α. However, a balance is needed as an amount of P-elF2α that is too elevated may not maintain cell homeostasis since elF2α, as a translation initiation factor, has other vital roles. The regulation of protein synthesis in a satellite cell is mediated by the phosphorylation of the translation initiation factor elF2α at serine 51. Skeletal muscle stem cells (i.e. satellite cells) unable to phosphorylate elF2α exit quiescence, activate the myogenic program, and differentiate, but do not self-renew. P-elF2α ensures, in part, the robust translational silencing of accumulating mRNAs. This accumulation helps prevent the activation of muscle stem cells (MuSc). Additionally, P-elF2α-dependent translation of mRNAs regulated by upstream open reading frames (uORFs) contributes to the molecular signature of stemness. Thus, the inhibition of the dephosphorylation of elF2α by the small compounds of formula (I) promotes satellite cell self-renewal at the expense of differentiation.

Therefore, the compound of formula (I) is useful in the treatment of a muscular degenerative disorder. The expressions "treatment" or "alleviation of symptoms" as used herein refer to the ability of a method, composition or compound to limit the development, progression, complications and/or symptomology of a muscular degenerative disease. In one embodiment, the treatment includes delaying the progression of muscular degeneration. In one embodiment, the treatment includes stopping the progression of muscular degeneration. In one embodiment, the treatment includes promoting muscular regeneration.

The symptoms include but are not limited to frequent falls, difficulty rising from a lying or sitting position, trouble running and jumping, waddling gait, walking on the toes, large calf muscles, muscle pain and stiffness, learning disabilities and/or delayed growth. Furthermore, the complications include but are not limited to trouble walking, trouble moving arms, shortening of muscles and/or tendons around joints (contractures), breathing problems, a curved spine (scoliosis), heart problems, and/or swallowing problems.

For example, the compound of formula (I) can be used in a cell therapy for satellite cells during ex vivo culture to increase their regenerative capacity after engraftment back into a host in need thereof. This cell therapy can be applied for example to treat muscular dystrophy (e.g. Duchenne muscular dystrophy). In the exemplary case of Duchenne muscular dystrophy, satellite cells from a healthy donor or human leukocyte antigen (HLA) matched donor can be extracted, cultured in the presence of the compound of formula (I), and engrafted into a patient to give rise to more dystrophin-positive fibers and more satellite cells undergoing self-renewal than an equivalent number of cells grown under regular culture conditions (without the compound of formula (I)). Moreover stem cells cultured under "normal or regular conditions" differentiate and cannot be used in subsequent therapies. By promoting the ex vivo expansion of muscle stem cells and retaining their regenerative capacity, the compound of formula (I) can be used to improve muscle stem cell transplantation. Accordingly in one embodiment, the compound of formula (I) is used in the treatment of a muscular degenerative disorder. In one embodiment, the muscular degenerative disorder is a muscular dystrophy, a muscle wasting associated with comorbidity (cachexia) and/or aging (i.e. sarcopenia). In one embodiment, the muscular dystrophy is one of Duchenne, Becker, myotonic, facioscapulohumeral (FSHD), congenital, or limb-girdle.

The compound of formula (I) can be formulated in a pharmaceutical composition with a pharmaceutically acceptable excipient and administered in vivo to treat a muscular degenerative disorder. The terms "excipient", "pharmaceutical excipient" or "pharmaceutically acceptable excipient" as used herein are to be understood as is known in the art. The terms "excipient", "pharmaceutical excipient" or "pharmaceutically acceptable excipient" may for example be defined as a pharmaceutically acceptable solvent, suspending agent, a tablet/capsule, or any other pharmacologically inert vehicle (solid or fluid) for delivering the compound of formula (I) to a subject. The pharmaceutical excipient can be selected to provide for the desired release kinetics, bulkiness, consistency, or any other relevant parameter, when combined with components of a given pharmaceutical composition, in view of the intended administration mode. In one example, pharmaceutical excipients include, but are not limited to binding agents (e.g., pregelatinized maize starch, polyvinylpyrrolidone or hydroxypropyl methylcellulose, etc.); fillers (e.g., lactose and other sugars, microcrystalline cellulose, pectin, gelatin, calcium sulfate, ethyl cellulose, polyacrylates or calcium hydrogen phosphate, etc.); lubricants (e.g., magnesium stearate, talc, silica, colloidal silicon dioxide, stearic acid, metallic stearates, hydrogenated vegetable oils, corn starch, polyethylene glycols, sodium benzoate, sodium acetate, etc.); disintegrants (e.g., starch, sodium starch glycotate, etc.); and wetting agents (e.g., sodium lauryl sulphate, etc.). The pharmaceutical composition can comprise other therapeutic agents. For example, the pharmaceutical composition can comprise a cocktail of drugs including the compound of formula (I). A treatment using the compound of formula (I) can be combined with other treatments or therapies of muscular degenerative disorders such as nutritional or exercise-based interventions that seek to maintain muscle mass and strength.

The compound of formula (I) can be used in the expansion of satellite cells, for example in cell therapies, but can also be used for maintaining a culture of satellite cells for research purposes. Therefore, in one embodiment, there is provided a cell culture media comprising the compound of formula (I). A "culture media" or "cell culture media" as used herein refers to any suitable media composition for culturing stem cells. In one embodiment, the medium comprises a base component (for example Dulbecco's Modified Eagle's Medium (DMEM)), a serum (for example fetal calf serum (FCS) and/or fetal bovine serum (FBS)), and optionally one or more additives (for example antibiotics, amino acids, inhibitor growth factors, Ultroser™ G, etc.). In one embodiment, the culture medium comprises between 0.05 to 0.3 µM C15, between 0.06 to 0.28 µM C15, between 0.07 to 0.26 µM C15, between 0.08 to 0.24 µM C15, between 0.09 to 0.22 µM C15, or between 0.1 to 0.2 µM C15.

EXAMPLE 1: SYNTHESIS AND CHARACTERIZATION OF C15

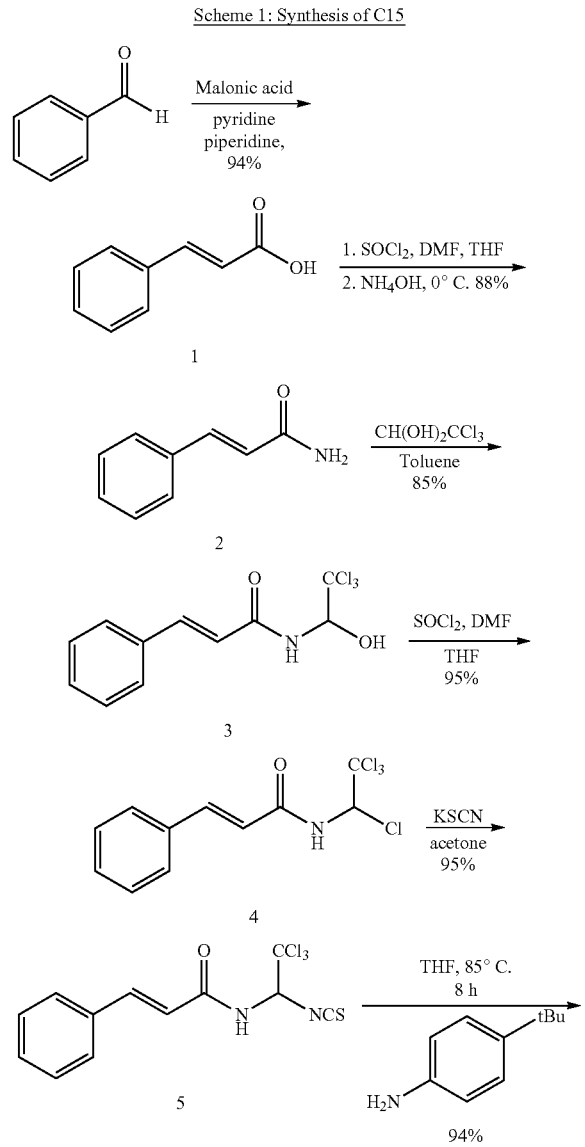

-continued

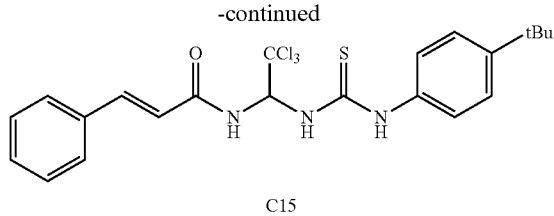

C15

Scheme 1 above summarizes the synthesis steps to obtain compound C15 starting from benzaldehyde according to the present example. Other methods may be used to synthesize C15 starting from benzaldehyde or other suitable compounds. In this exemplary synthesis, all chemicals and solvents were purchased from Sigma Aldrich, Alfa Aesar, TCI, or Oakwood Chemicals. All chemical solvents were dried and purified using an MBraun™ MB SPS 800 or Innovative Technology PureSolv™ MD 7. Unless otherwise stated, reactions were performed in flame-dried glassware under a nitrogen or argon atmosphere. Column chromatography was conducted using 200-400 mesh silica gel from Silicycle. $^1$H-NMR spectra were acquired using Bruker Ascend™ 500 MHZ, Bruker Ascend™ 400 MHZ, and Varian Inova™ 400 MHz spectrometers. Chemical shifts (δ) are reported in parts per million (ppm) and are calibrated to the residual solvent peak. Coupling constants (J) are reported in Hz. Multiplicities are reported using the following abbreviations: s=singlet; d=doublet; t=triplet; q=quartet; m=multiplet (range of multiplet is given). $^{13}$C-NMR spectra were acquired using Bruker Ascend™ 125 MHZ, Bruker Ascend™ 100 MHZ, and Varian Inova™ 100 MHz spectrometers. Chemical shifts (δ) are reported in parts per million (ppm) and are calibrated to the residual solvent peak. Analytical thin-layer chromatography was performed on pre-coated 250 mm layer thickness silica gel 60 F254 plates (EMD Chemicals Inc.).

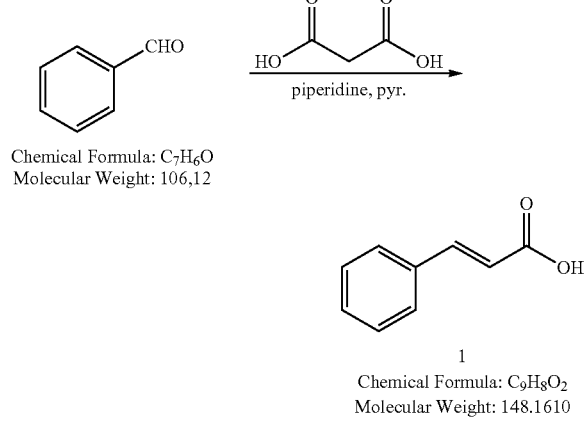

Chemical Formula: $C_7H_6O$
Molecular Weight: 106,12

Chemical Formula: $C_9H_8O_2$
Molecular Weight: 148.1610

Step of Obtaining Intermediate Compound 1 from Benzaldehyde

In a flame-dried round bottom flask benzaldehyde (5.31 g, 50.0 mmol, 1 equiv.) was combined with malonic acid (10.41 g, 100.0 mmol, 2 equiv.) and piperidine (0.49 mL, 5 mmol, 0.1 equiv.) in anhydrous pyridine (100 mL, 0.5 M) and heated at 100° C. for 8 h. The reaction mixture was cooled to room temperature, quenched with 2M HCl, extracted with dichloromethane (DCM), dried with MgSO$_4$ and concentrated in vacuo. The obtained solid was then washed with water and collected via vacuum filtration to afford intermediate compound 1 (6.96 g, 47.0 mmol) as a white solid in 94% isolated yield.

A nuclear magnetic resonance (NMR) analysis was used to confirm that intermediate compound 1 was obtained as shown in the step above in scheme 1. The appropriate corresponding bands were obtained with both $^1$H NMR (300 MHZ, Acetone-d$_6$) δ 10.78 (bs, 1H), 7.75-7.65 (m, 3H), 7.48-7.40 (m, 3H), 6.55 (d, J=16.1 Hz, 1H) ppm; and with $^{13}$C NMR (75 MHZ, Acetone-d$_6$) δ 167.0, 144.6, 134.6, 130.2, 128.9, 128.1, 118.3 ppm.

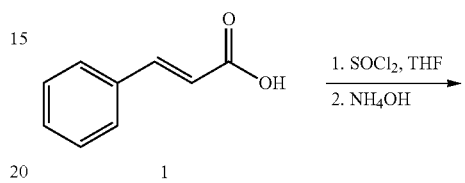

1
Chemical Formula: $C_9H_8O_2$
Molecular Weight: 148.1610

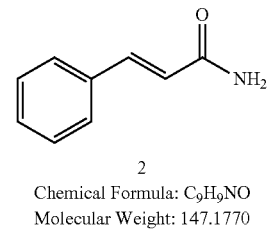

2
Chemical Formula: $C_9H_9NO$
Molecular Weight: 147.1770

Step of Obtaining Intermediate Compound 2 from Intermediate Compound 1

In a flame-dried round bottom flask equipped with a Teflon-coated stir bar, intermediate compound 1 (100.0 g. 0.675 mol, 1 equiv.) was added to a mixture of SOCl$_2$ (146.8 mL, 2.025 mol, 3 equiv.) and dimethylformamide (DMF) (2.61 mL, 33.75 mmol, 0.05 equiv) in anhydrous tetrahydrofuran (THF) (675 mL, 1 M) and heated at reflux for 2 h. The reaction mixture was cooled to room temperature, the solvent removed in vacuo, and the residue was carefully added dropwise to a cooled solution of NH$_4$OH (120 mL, 5 equiv.). The obtained solid was then vacuum filtered and washed with water to yield intermediate compound 2 (87.42 g, 0.594 mol) as a white powder in an 88% isolated yield.

A NMR analysis was used to confirm that intermediate compound 2 was obtained as shown in the step above in scheme 1. The appropriate corresponding bands were obtained with both $^1$H NMR (300 MHz, Acetone-d$_6$) δ 7.62-7.54 (m, 3H), 7.43-7.31 (m, 3H), 7.12 (bs, 1H), 6.75 (d, J=15.8 Hz, 1H), 6.74 (bs, 1H) ppm; and with $^{13}$C NMR (75 MHZ, Acetone-d$_6$) δ 167.0, 140.1, 135.3, 129.4, 128.8, 127.6, 121.7 ppm.

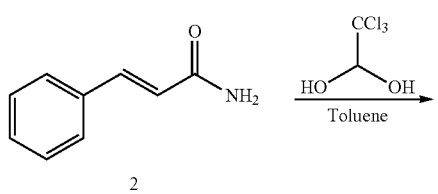

2
Chemical Formula: $C_9H_9NO$
Molecular Weight: 147.1770

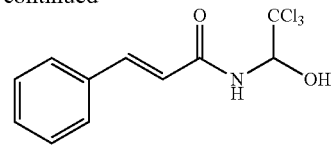

3
Chemical Formula: $C_{11}H_{10}Cl_3NO_2$
Molecular Weight: 294.5560

Step of Obtaining Intermediate Compound 3 from Intermediate Compound 2

In a round bottom flask equipped with a Teflon-coated stir bar, intermediate compound 2 (87.42 g, 0.594 mol, 1 equiv.) was combined with chloral hydrate (196.49 g, 1.19 mol, 2 equiv.) in toluene (600 mL, 1 M) and heated at reflux for 12 h. The reaction mixture was allowed to cool to room temperature, placed into an ice bath, and the obtained solid was collected via vacuum filtration and washed with cold toluene to obtain intermediate compound 3 (148.72 g, 0.505 mol) as white crystals in 85% isolated yield.

A NMR analysis was used to confirm that intermediate compound 3 was obtained as shown in the step above in scheme 1. The appropriate corresponding bands were obtained with both $^1$H NMR (500 MHz, Acetone-$d_6$) δ 8.06 (d, J=9.4 Hz, 1H), 7.68 (d, J=15.7 Hz, 1H), 7.63 (dd, J=7.8, 1.8 Hz, 2H), 7.47-7.37 (m, 3H), 6.94 (d, J=15.7 Hz, 1H), 6.78-6.69 (m, 1H), 6.18-6.08 (m, 1H) ppm; and with $^{13}$C-NMR: (125 MHZ, $(CD_3)_2CO$): 165.1, 141,7, 135.0, 129.8, 128.9, 127.8, 120.7, 102.2, 81.1 ppm.

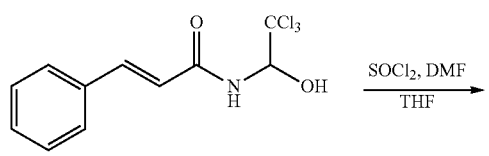

3
Chemical Formula: $C_{11}H_{10}Cl_3NO_2$
Molecular Weight: 294.5560

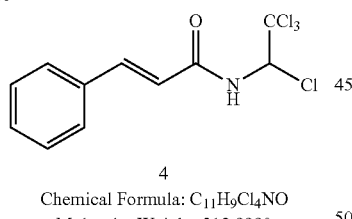

4
Chemical Formula: $C_{11}H_9Cl_4NO$
Molecular Weight: 312.9990

Step of Obtaining Intermediate Compound 4 from Intermediate Compound 3

In a flame-dried round bottom flask equipped with a Teflon-coated stir bar, intermediate compound 3 (148.72 g, 0.505 mol, 1 equiv.) was added to a mixture of $SOCl_2$ (110 mL, 1.515 mol, 3 equiv.) and DMF (1.96 mL, 25.25 mmol, 0.05 equiv.) in anhydrous THF (505 mL, 1 M) and heated at reflux for 2 h. The reaction mixture was cooled to room temperature, the solvent removed in vacuo, and the obtained solid was washed with cold hexanes and dried under vacuum to afford intermediate compound 4 (150.16 g, 0.480 mol) as a light yellow powder in 95% isolated yield.

A NMR analysis was used to confirm that intermediate compound 4 was obtained as shown in the step above in scheme 1. The appropriate corresponding bands were obtained with both $^1$H-NMR: (500 MHZ, $(CD_3)_2CO$): 8.78 (d, J=10.8 Hz, 1H), 7.75 (d, J=15.4 Hz, 1H), 7.64 (m, 2H), 7.43 (m, 3H), 6.92 (d, J=15.4 Hz, 1H), 6.82 (d, J=10.8 Hz, 1H) ppm; and with $^{13}$C-NMR: (125 MHZ, $(CD_3)_2CO$): 164.8, 143.5, 134.6, 130.3, 129.0, 128.1, 119.2, 99.6, 75.0 ppm.

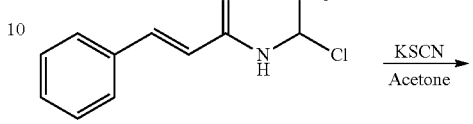

4
Chemical Formula: $C_{11}H_9Cl_4NO$
Molecular Weight: 312.9990

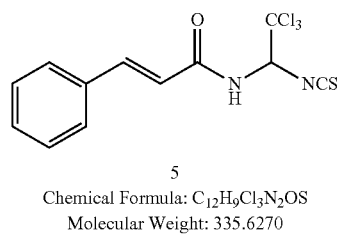

5
Chemical Formula: $C_{12}H_9Cl_3N_2OS$
Molecular Weight: 335.6270

Step of Obtaining Intermediate Compound 5 from Intermediate Compound 4

In a round bottom flask equipped with a Teflon-coated stir bar, potassium thiocyanate (46.65 g, 0.48 mol) was combined with intermediate compound 4 (150.16 g, 0.48 mol, 1 equiv.) and refluxed in acetone (480 mL, 1 M) for 1 h. The reaction was cooled to room temperature, the white solid was filtered off and the filtrate was concentrated under reduced pressure to afford intermediate compound 5 (153.05 g, 0.456 mol) as a yellow solid in 95% isolated yield.

A NMR analysis was used to confirm that intermediate compound 5 was obtained as shown in the step above in scheme 1. The appropriate corresponding bands were obtained with both $^1$H-NMR: (500 MHz, $(CD_3)_2CO$): 8.80 (d, J=9 Hz, 1H), 7.76 (d, J=16.1 Hz, 1H), 7.65 (m, 2H), 7.45 (m, 3H), 6.91 (d, J=16.6 Hz, 1H), 6.61 (d, J=9 Hz, 1H) ppm; and with $^{13}$C-NMR: (125 MHZ, $(CD_3)_2CO$): 165.2, 143.4, 142.1, 134.6, 130.3, 129.0, 128.1, 119.2, 99.3, 73.0 ppm.

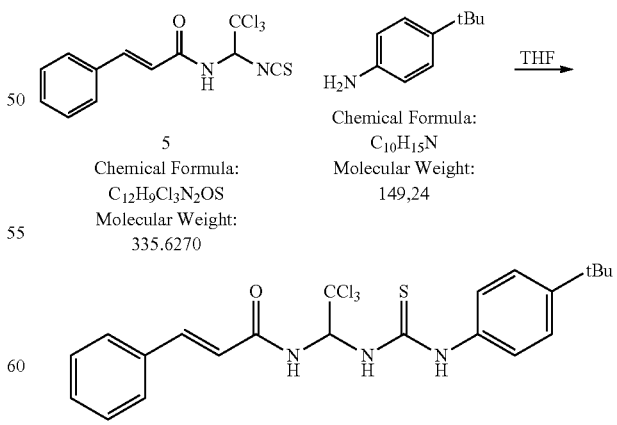

5
Chemical Formula: $C_{12}H_9Cl_3N_2OS$
Molecular Weight: 335.6270

Chemical Formula: $C_{10}H_{15}N$
Molecular Weight: 149,24

C15
Chemical Formula: $C_{22}H_{24}Cl_3N_3OS$
Molecular Weight: 484.8640

Step of Obtaining C15 from Intermediate Compound 5 and 4-tert-butylaniline

In a pressure vial equipped with a Teflon-coated stir bar, intermediate compound 5 (1.58 g, 4.0 mmol, 1 equiv.) was combined with 4-tert-butylaniline (637 µL, 4.0 mmol, 1 equiv.) and dissolved in THF (20 mL, 0.2M). The pressure vial was sealed with the screwcap and heated at 85° C. for 8 h. The mixture was cooled to room temperature, the vial was opened, the solvent was removed in vacuo and the solid was suspended in cold ethyl acetate (EtOAc) and vacuum filtered to obtain C15 (1.82 g, 3.76 mmol) in 94% isolated yield.

Figure 2:
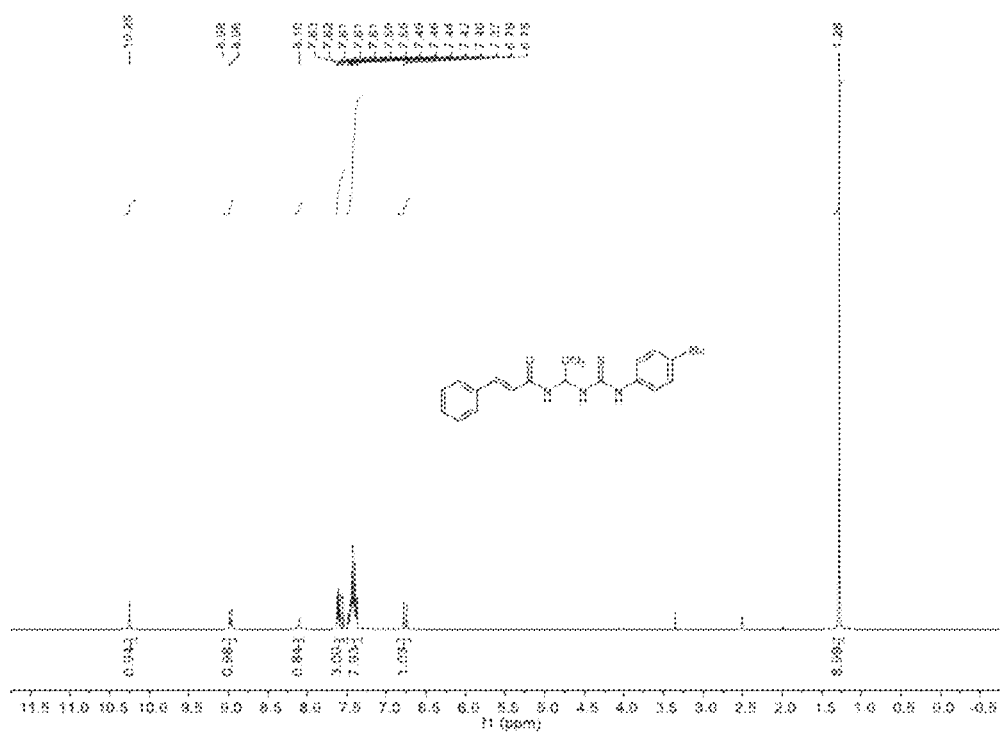
FIG. 2 is the $^1$H-NMR spectrum of compound C15 produced by an exemplary fabrication method.
Figure 3:
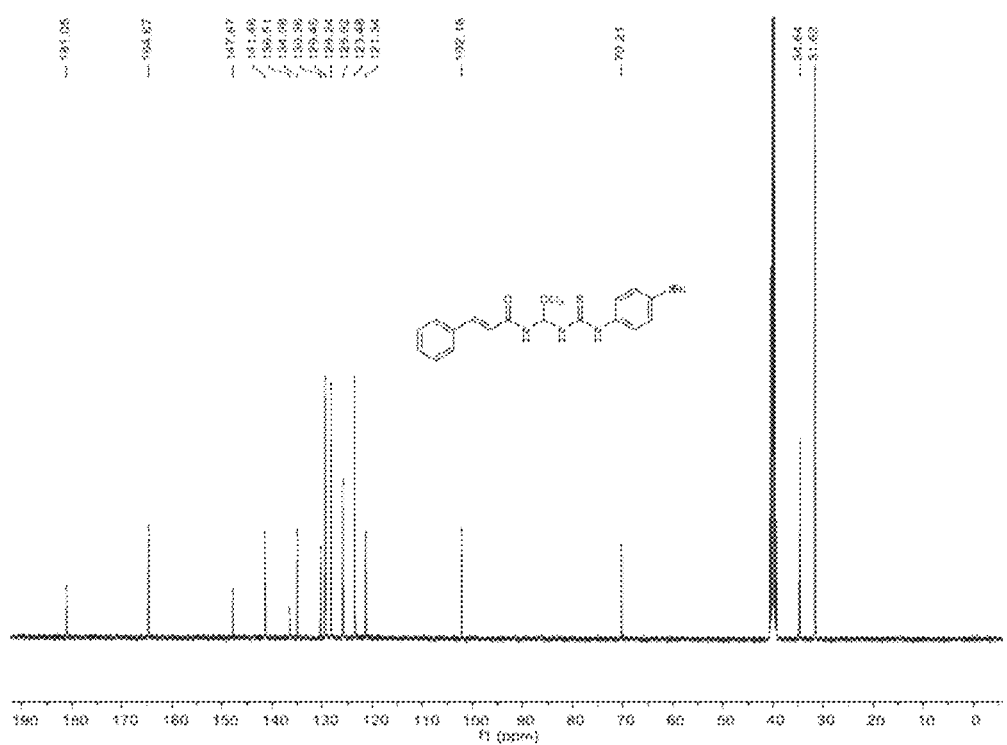
FIG. 3 is the $^{13}$C-NMR spectrum of compound C15 produced by an exemplary fabrication method.

The identity of the compound obtained was confirmed to be C15 using an infra red analysis (IR), a NMR, and a high resolution mass spectrometry (HRMS). The IR (neat) analyst revealed peaks at v=3233.6, 2962.3, 1659.8, 1625.4, 1550.5, 1450.6, 1289.5, 1037.7, 986.7, 834.4, 827.6, 805.1, 739.4, 633.3, 520.3, 490.3 cm$^{-1}$ were consistent with the chemical structure of C15 (FIG. 1). Further, the bands of $^{1}$H NMR (400 MHz, DMSO-$d_6$) δ 10.25 (s, 1H), 8.97 (d, J=8.7 Hz, 1H), 8.10 (s, 1H), 7.65-7.54 (m, 3H), 7.43 (m, 8H), 6.77 (d, J=15.8 Hz, 1H), 1.28 (s, 9H) ppm (FIG. 2); and $^{13}$C NMR (101 MHz, DMSO-$d_6$) δ 181.1, 164.7, 147.9, 141.5, 136.5, 135.0, 130.4, 129.5, 128.2, 125.9, 123.5, 121.3, 102.2, 70.2, 34.6, 31.6 ppm (FIG. 3) were both consistent with the chemistry of C15. Finally, the HRMS (Calcd. for $C_{22}H_{24}Cl_3N_3NaOS$: [M+Na]+: 506.0598 m/z, found 506.0601 m/z) confirmed that the compound obtained was C15 (FIG. 4).

EXAMPLE 2: EFFECT OF C15 ON P-elF2α

In this example, the effect of C15 on the dephosphorylated levels of elF2α was studied. Animal care practices were performed in accordance with the federal Canadian Council on Animal Care, as practiced by McGill University. All mice were maintained on a C57/Bl6 background. Dmd$^{mdx}$ mice, aged 8-10 weeks, were implanted (sub-cutaneously) with osmotic pumps (Alzet™) to deliver C15 at a rate of 2.5 mg/kg/day. C15 was dissolved in a 50:50 solution of DMSO: PEG400. At indicated time points, muscle was harvested for analysis by immunofluorescence.

The Atf4- and Tacc3-luciferase constructs were made by cloning gBlock gene fragments (Integrated DNA Technologies) corresponding to 5'UTRs of Mus musculus Atf4 and Tacc3, fused to the 5'end of the fluc gene up to the NarI restriction enzyme site. Mutant versions of Atf4 and Tacc3 5'UTRs were designed with each ATG start codon of uORFs deleted. These 5'UTR gene fragments were cloned into HindIII, NarI sites upstream of the firefly luciferase (fluc) gene in pGL3-promoter plasmids, thereby maintaining the final overlapping uORF with the main ORF for fluc (Promega™). FIG. 5A and FIG. 5B show a schematic of the formation of a pre-initiation complex that includes many factors including the a subunit (elF2α) that is dephosphorylated (FIG. 5A) or phosphorylated (FIG. 5B). The pre-initiation complex associates with the uORFs, where, if phosphorylated, translation initiation of the uORFs occurs upstream of Atf4 and continues to translate Atf4. However, if elF2α is dephosphorylated (FIG. 5A), no translation initiation occurs for Atf4 as the pre-initiation complex dissociates from the uORFs.

HEK293 cells were plated in 24-well plates at a density of 25,000 cells/well and incubated overnight. Fluc reporter plasmids and pRL-TK Renilla luciferase (Rluc) transfection control plasmid (Promega™) were co-transfected into these cells using jetPRIME™ transfection reagent (Illkirch-Graffenstaden, France). Cells were incubated overnight in the presence or absence of 10 µM sal003 (Sigma) (formula II), C10 (formula III), C15 (formula I) or DMSO (negative control). The cells were then lysed and the Fluc/Rluc ratio was determined using the Promega™ Dual-Luciferase Reporter kit (Madison, USA).

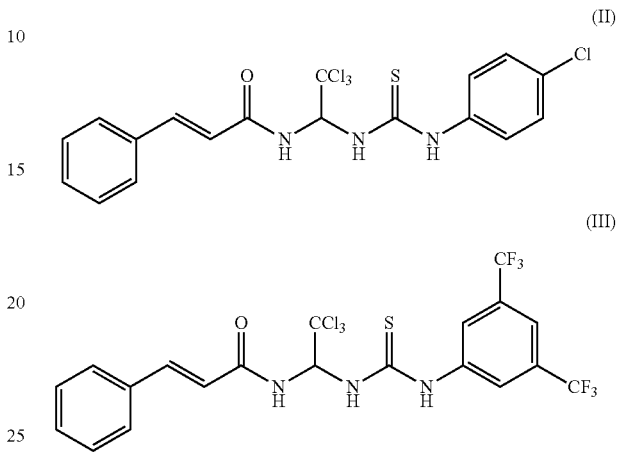

Figure 6:
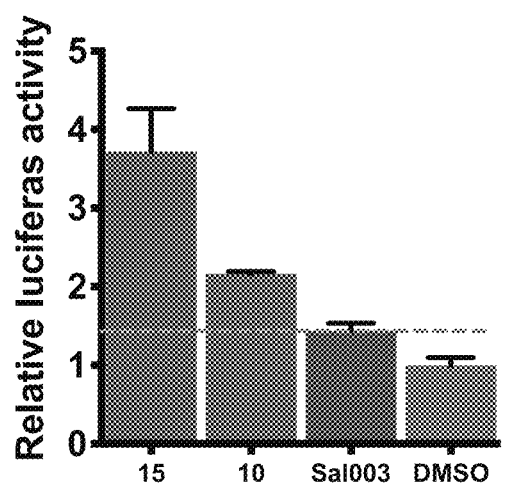
FIG. 6 is a graph of the luciferase activity (vector of Luc with uORFs in the 5'UTR of Atf4) for cells in the presence of compound C15, compound C10, compound Sal003, and DMSO (negative control).

FIG. 5C shows the Atf4-luc reporter which has a P-elF2α dependent read-through upstream ORFs (uORFs) for luciferase expression. The 293 cells were transiently transfected with the Atf4-fluc reporter, and treated with sal003, C10, C15 and DMSO. These experiments revealed that C15 significantly increases luciferase activity, higher than sal003 and C10 (FIG. 6).

Moreover, cells and single EDL myofibres were cultured in 39% Dulbecco's modified eagle medium (DMEM), 39% F12, 20% fetal calf serum (FCS) (Life Technologies), 2% UltroserG™ (Pall Life Sciences). C2C12 myoblasts were cultured in DMEM supplemented with 20% FCS. When indicated, culture conditions were supplemented with 0.1% dimethylsulfoxide (DMSO control, Sigma), 10 µM sal003 (Sigma), or 0.1-0.2 µM C15. Different concentrations of Sal003 and C15 were used because it was not possible to expand the cells ex vivo at sal003 concentrations lower than 10 µM.

Figure 7A:
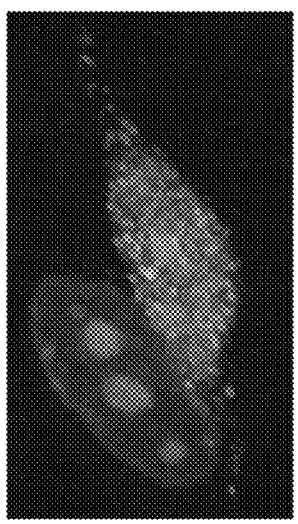
FIG. 7A is a microscopy image of satellite cells in culture at t=0 hours with DAPI in blue, PAX7 in green, and DDX6 in red.
Figure 7B:
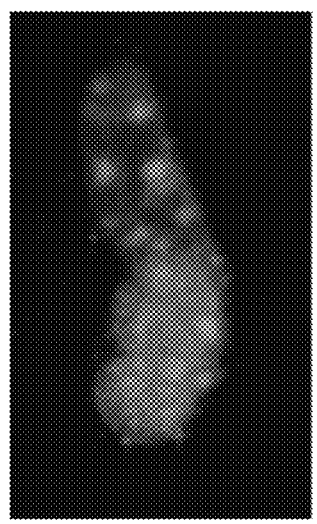
FIG. 7B is a microscopy image of satellite cells in culture at t=6 hours in the presence of 200 nM C15, with DAPI in blue, PAX7 in green, and DDX6 in red.
Figure 7C:
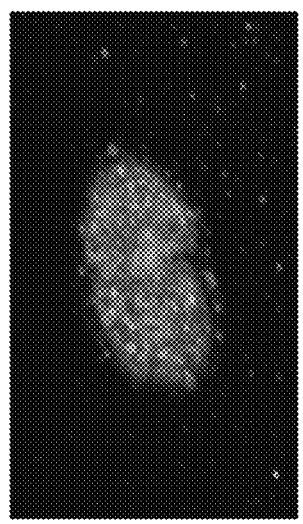
FIG. 7C is a microscopy image of satellite cells in culture at t=6 hours in the presence of DMSO (control), with DAPI in blue, PAX7 in green, and DDX6 in red.
Figure 8:
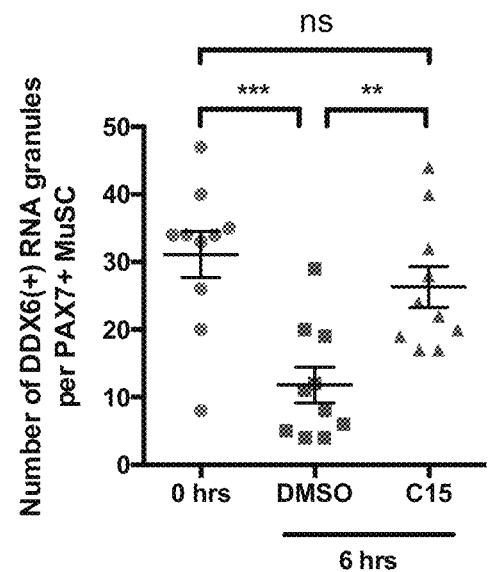
FIG. 8 is a graph showing the number of DDX6 positive RNA granules per PAX7 positive muscle stem cell at t=0 hours (●), at t=6 hours with 200 nM C15 (▲), and at t=6 hours with DMSO (control) (■).
Figure 9A:
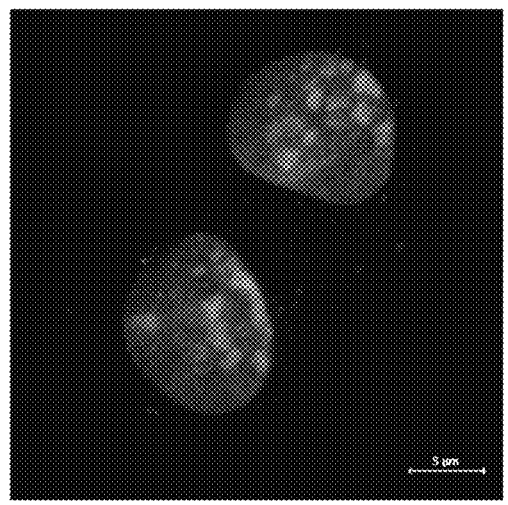
FIG. 9A is a microscopy image (scale bar 5 μm) of Pax3$^{GFP/+}$ muscle stem cells stained for DAPI (blue), DDX6 (red), and PAX7 (green) cultured for 4 days with DMSO (control).
Figure 9B:
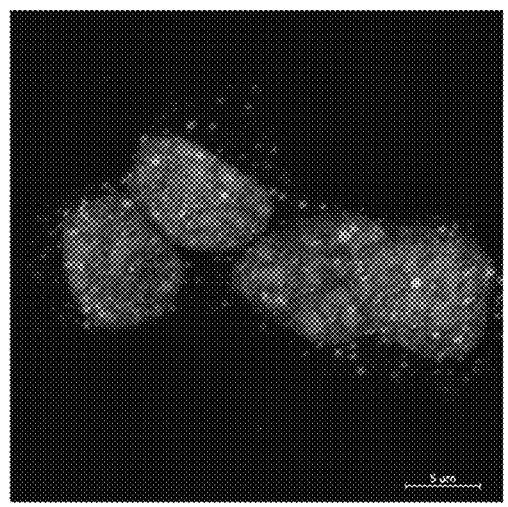
FIG. 9B is a microscopy image (scale bar 5 μm) of Pax3$^{GFP/+}$ muscle stem cells stained for DAPI (blue), DDX6 (red), and PAX7 (green) cultured for 4 days with 200 nM of C15.

P-elF2α is required for the assembly of DDX6-positive (+) RNA granules in quiescent and self-renewing satellite cells. Activated muscle stem cells (MuSCs) dephosphorylate elF2α, RNA granules disassemble, and the myogenic program is activated. The RNA granules in PAX7-expressing MuSCs were showed to be maintained in the presence of 0.2 µM C15 during culture of single myofibres after 6 h (FIG. 7A, FIG. 7B, FIG. 7C fluorescence microscopy images and FIG. 8 quantification of the fluorescent cells), and during 4-day culture of isolated MuSCs (FIG. 9A and FIG. 9B).

Figure 10A:
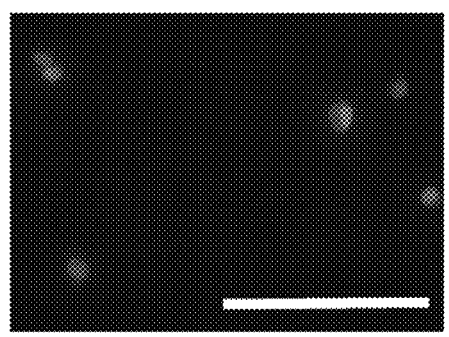
FIG. 10A is a microscopy image (scale bar 100 μm) of Dmd$^{mdx}$;Pax3$^{GFP/+}$ muscle stem cells stained for PAX7 (green), myogenin (red), and DAPI (blue) cultured for 3 days with DMSO (control).
Figure 10B:
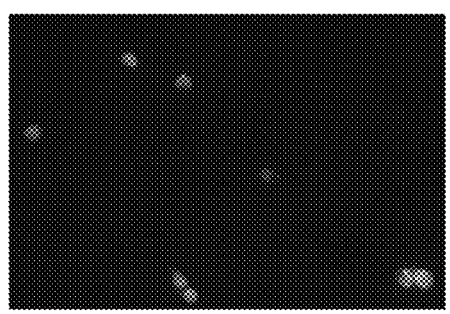
FIG. 10B is a microscopy image (scale bar 100 μm) of Dmd$^{mdx}$;Pax3$^{GFP/+}$ muscle stem cells stained for PAX7 (green), myogenin (red), and DAPI (blue) cultured for 3 days with 200 nM of C15.
Figure 11:
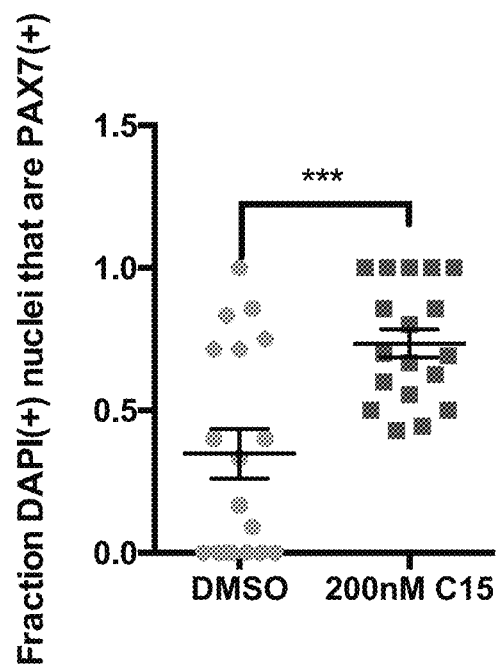
FIG. 11 is a graph of the fraction of DAPI positive nuclei that are PAX7 positive for Dmd$^{mdx}$;Pax3$^{GFP/+}$ muscle stem cells) cultured for 3 days with DMSO (control) (●) and with 200 nM of C15 (■).
Figure 12A:
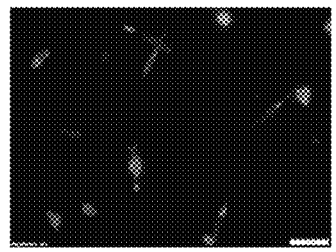
FIG. 12A is a microscopy image of Dmd$^{mdx}$;Pax3$^{GFP/+}$ muscle stem cells cultured for 7 days in the presence of DMSO, stained for PAX7 (green), MHC (red), and DAPI (blue).
Figure 12B:
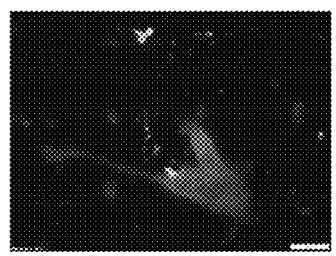
FIG. 12B is a microscopy image of Dmd$^{mdx}$;Pax3$^{GFP/+}$ muscle stem cells cultured for 7 days in the presence of 200 nM C15, stained for PAX7 (green), MHC (red), and DAPI (blue).
Figure 12C:
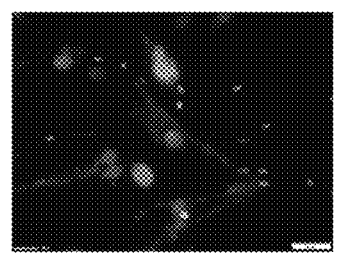
FIG. 12C is a microscopy image of Dmd$^{mdx}$;Pax3$^{GFP/+}$ muscle stem cells cultured for 7 days in the presence of 10 μm C15, stained for PAX7 (green), MHC (red), and DAPI (blue).
Figure 13:
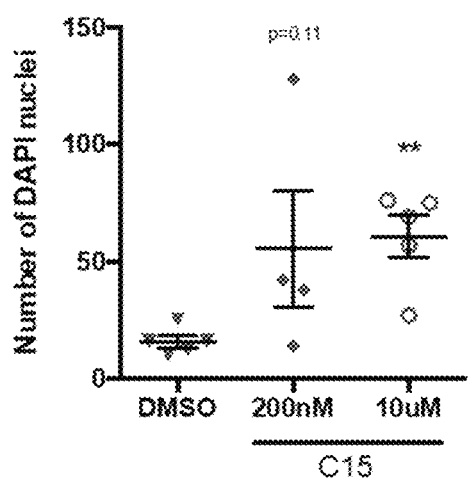
FIG. 13 is a graph of the number of DAPI nuclei of Dmd$^{mdx}$;Pax3$^{GFP/+}$ muscle stem cells cultured for 7 days in the presence of DMSO (▼), 200 nM C15 (♦), and 10 μm C15 (○) which shows the average myocolony size.
Figure 14:
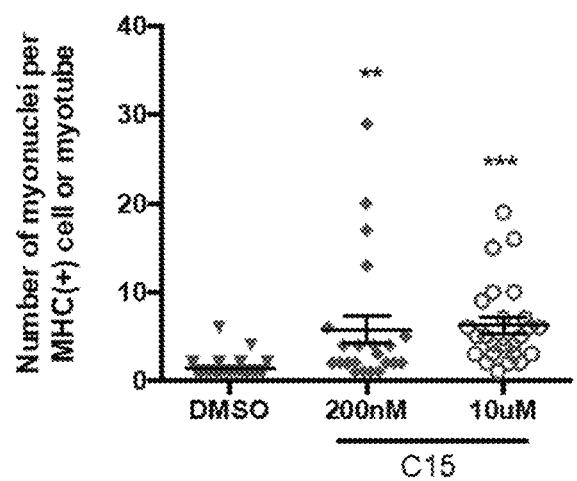
FIG. 14 is a graph of the number of myonuclei per MHC positive cell or myotube of Dmd$^{mdx}$;Pax3$^{GFP/+}$ muscle stem cells cultured for 7 days in the presence of DMSO (▼), 200 nM C15 (♦), and 10 μm C15 (○) which shows the fusion index.

PAX7 expression marks MuSCs that retained stem cell properties to regenerate muscle. Under normal culture conditions, PAX7-expression is down regulated as MuSCs differentiate and lose their stem cell properties to regenerate muscle. Moreover, MuSCs from dystrophic muscle typically exhibit low PAX7 expression and undergo precocious differentiation at the expense of expansion and self-renewal. MuSCs isolated from skeletal muscle of Dmd$^{mdx}$ mice were demonstrated to maintain PAX7 expression in the presence of 0.2 µM C15 (FIG. 10A and FIG. 10B fluorescence microscopy image and FIG. 11 quantification of the fluorescent cells). Conceptually, these ex vivo results support a model by which pharmacological interventions that promote MuSC expansion (FIG. 10A, FIG. 10B, and FIG. 11) in the short term will lead to improved muscle mass and strength in the long term. In addition, the expansion of MuSCs in the presence of 0.2 μM C15 for long periods of time lead to larger myocolonies (FIG. 12A, FIG. 12B, FIG. 12C, fluorescence microscopy images and FIG. 13 quantification of the florescent cells) and a larger fusion index (the number of nuclei per myotube) (FIG. 14).

Immunoassays were also performed to further confirm the effect of C15 on the dephosphorylation of eIF2α. For immunofluorescence, cultured satellite cells were fixed in 4% paraformaldehyde (PFA), permeabilized with 0.2% Triton™, 50 mM NH$_4$Cl and blocked in 5% horse serum (HS). Single EDL myofibers were fixed with 4% PFA, permeabilized with 0.1% Triton™ in PBS and blocked in 5% horse serum (HS) with 0.1% Triton™ in PBS. TA muscles were fixed for 2 hr in 0.5% PFA at 4° C. and equilibrated overnight in 20% sucrose at 4° C. Tissues were mounted in Frozen Section Compound (VWR) and flash frozen in a liquid nitrogen-cooled isopentane bath. Transverse sections (10 μm) were permeabilized with 0.1% Triton™, 0.1M Glycine in PBS, and blocked in Mouse on Mouse (M.O.M.) reagent (Vector Labs).

For immunoblotting, cell lysates were obtained in RIPA buffer (ThermoFischer Scientific) supplemented with complete protease inhibitor cocktail (Roche) and phosphatase inhibitor cocktail (Sigma). The primary antibodies used were against PAX7 (DHSB), LAMININ (Sigma L9393), MYOG (Abcam 124800 and Santacruz sc-12732), and β-ACTIN (Sigma A5441). Alexa™ Fluor-488, Alexa™ Fluor-594 and Alexa™ Fluor-647 conjugated secondary anti-mouse IgG1, anti-mouse IgG2B or anti-rabbit antibodies (Life technologies) were used for immunofluorescence. Horseradish peroxidase (HRP) conjugated anti-mouse or anti-rabbit secondary antibodies (Jackson Immunoresearch) were used with the ECL™ Prime Western Blotting Detection reagents (GE Healthcare). Densitometry of immunoblots was performed with ImageJ™.

Figure 15:
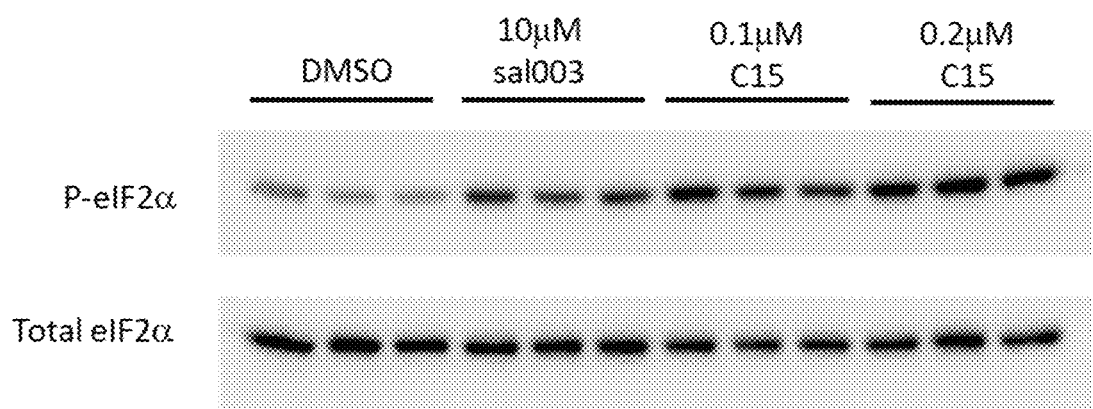
FIG. 15 is an immunoblot for P-eIF2α and total eIF2α of lysates from C2C12 cells cultured in the presence of DMSO, Sal003 (10 μM), C15 (0.1 μM), and C15 (0.2 μM) for 12 hours.
Figure 16:
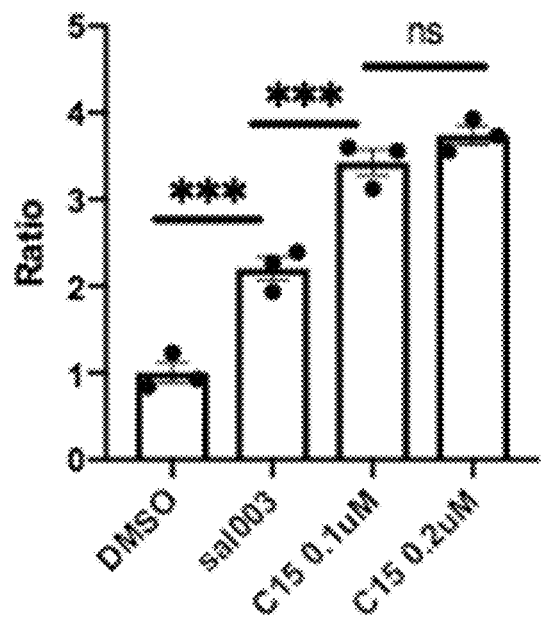
FIG. 16 is a graph of the ratio of P-eIF2α and total eIF2α for lysates from C2C12 cells cultured in the presence of DMSO, Sal003 (10 μM), C15 (0.1 μM), and C15 (0.2 μM) for 12 hours.

To determine the effect of C15 on eIF2α phosphorylation, C2C12 cell lysates cultured for twelve hours in the presence of sal003 (10 μM) or C15 (0.1 μM and 0.2 μM) were immunoblotted. The C15 added in concentrations ranging from 0.1 to 0.2 μM increased the P-eIF2α levels to a level equivalent to 10 μM sal003 (50× and 100×) (FIG. 15 and FIG. 16). Therefore, the efficacy of C15 was demonstrated to be significantly improved when compared to sal0003.

Figure 17:
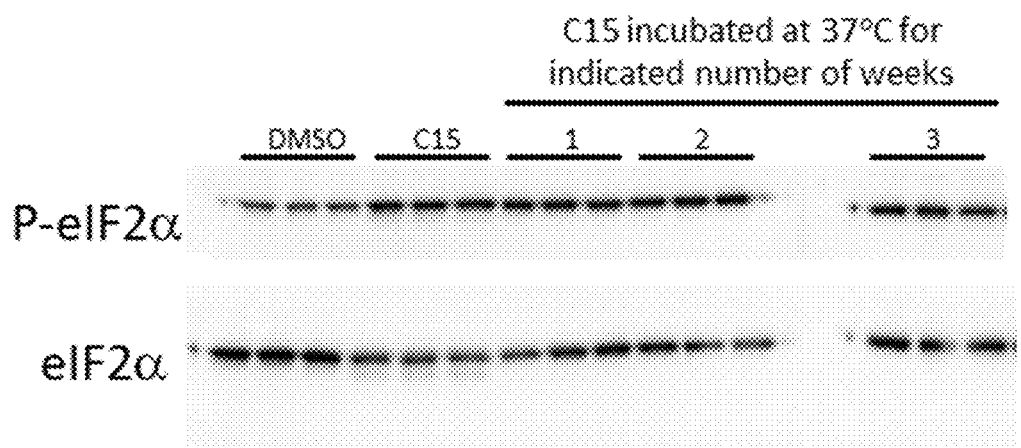
FIG. 17 is an immunoblot for P-eIF2α and eIF2α of C2C12 cells in the presence of DMSO or C15(10 μM). C15 was incubated with C2C12 cells at 37° C. for 0, 1, 2 or 3 weeks, and was then assayed.
Figure 18:
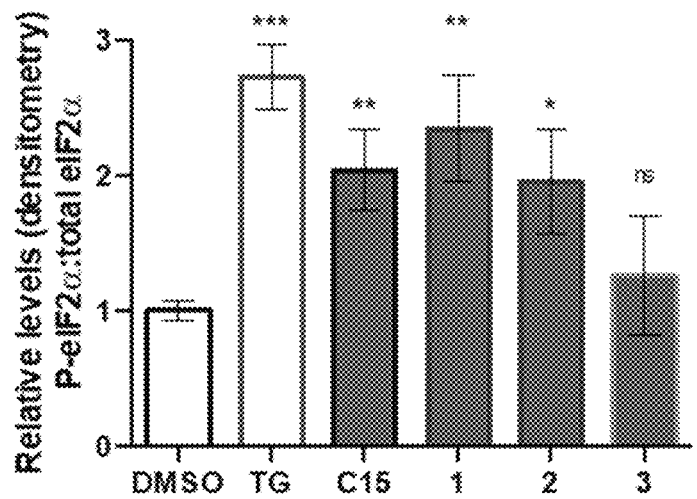
FIG. 18 is a graph of the relative levels (densitometry) P-eIF2α: total eIF2α for C2C12 cells in the presence of DMSO, Thapsigargin (TG) a positive control (0.1 μM) that induces eIF2α phosphorylation or C15 (10 μM). C15 was incubated with C2C12 cells at 37° C. for 0, 1, 2 or 3 weeks, and was then assayed.
Figure 19:
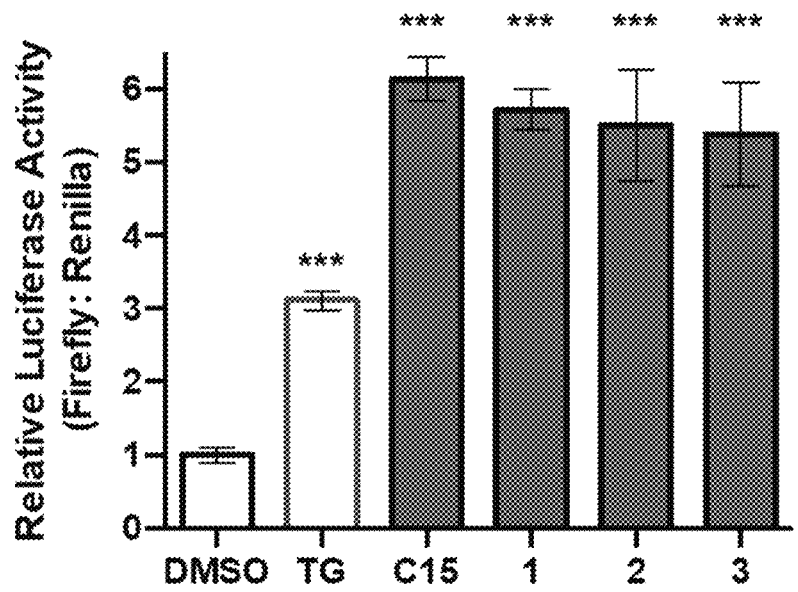
FIG. 19 is a graph of the relative luciferase activity (Firefly: *Renilla*) for HEK293 cells transfected with Luc downstream of the uORFs of Atf4, in the presence of DMSO, TG (0.1 μM), or C15 (10 μM). C15 was incubated with HEK293 cells at 37° C. for 0, 1, 2 or 3 weeks, and was then assayed.

C15 maintained the activity of increasing P-eIF2α levels (FIG. 17 and FIG. 18), and P-eIF2α activity to enable read-through of uORFs (FIG. 19) up to three weeks after incubation at 37° C. These results show that C15 maintained its activity at physiological temperature over a period of three weeks.

Figure 20:
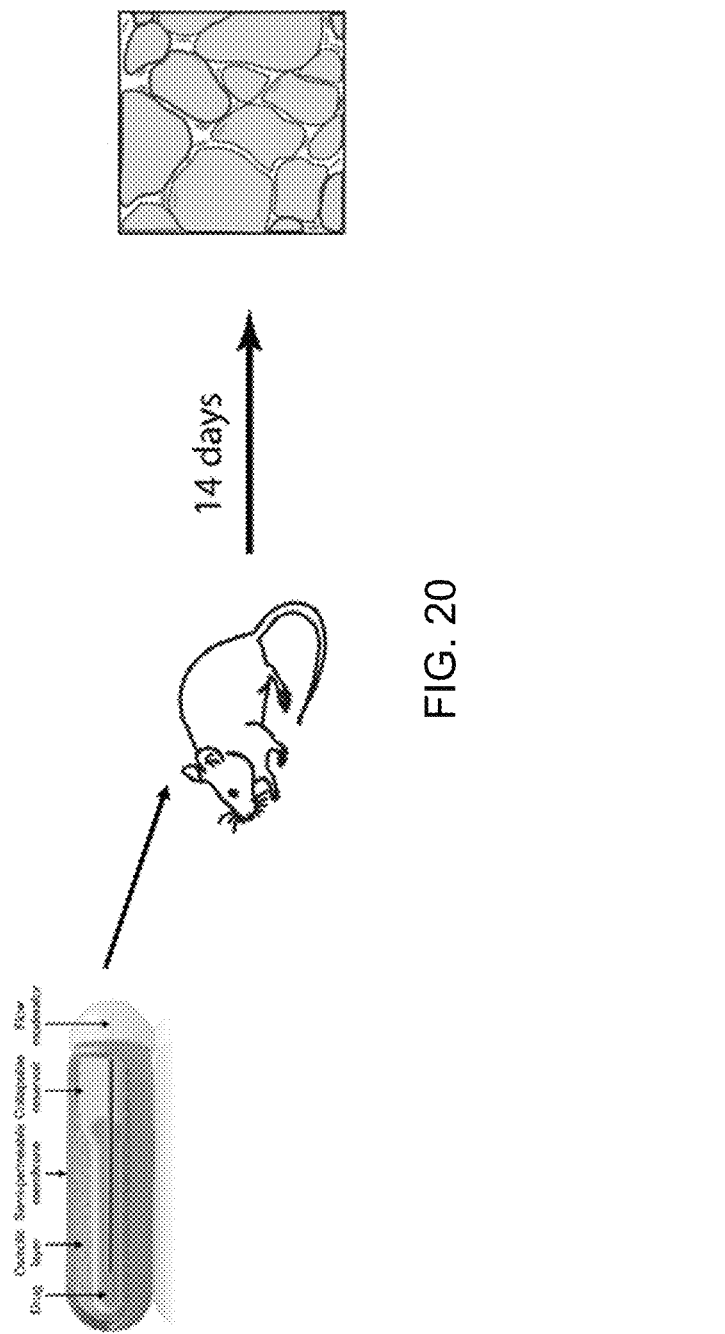
FIG. 20 is a schematic diagram of in vivo administration of C15 by an osmotic pump in the Dmd$^{mdx}$ mouse model of Duchenne muscular dystrophy, specifically Alzet™ 2001 osmotic pumps were used to deliver 2.5 mg/kg/day of C15 with a vehicle containing 50:50 DMSO:PEG4 at a flow rate of 0.5 μL/hr by a subcutaneous implantation of the Alzet™ 2001 osmotic pumps into Dmd$^{mdx}$ mouse, and 14 days later muscle was harvested for quantification by fluorescence of the myofibre CSA (red) and PAX7(+) (green) satellite cell compartment.
Figure 23:
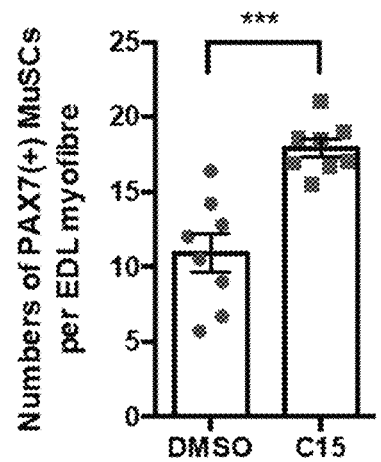
FIG. 23 is a graph of the numbers of PAX7 positive muscle stem cells per EDL myofiber treated with DMSO (●) and C15 (■).
Figure 24:
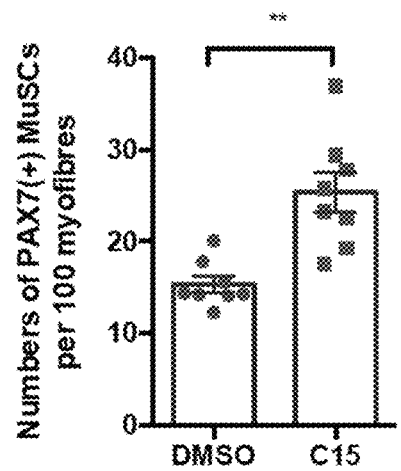
FIG. 24 is a graph of PAX7 positive muscle stem cells per 100 myofibers (TA Dmd$^{mdx}$ muscle stem cells) treated with DMSO (●) and C15 (■).
Figure 25:
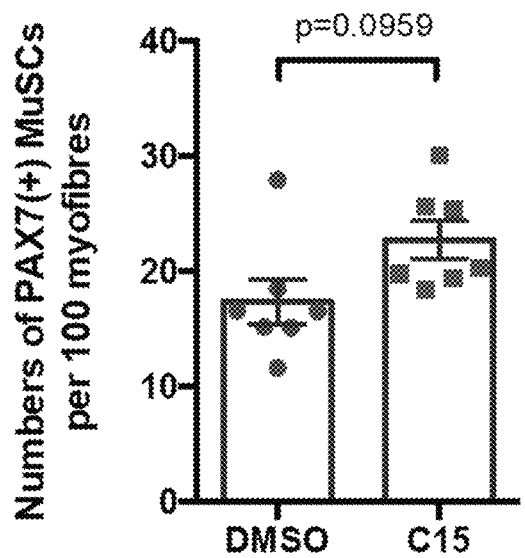
FIG. 25 is a graph of PAX7 positive muscle stem cells per 100 myofibers (diaphragm Dmd$^{mdx}$ muscle stem cells) treated with DMSO (●) and C15 (■).
Figure 26:
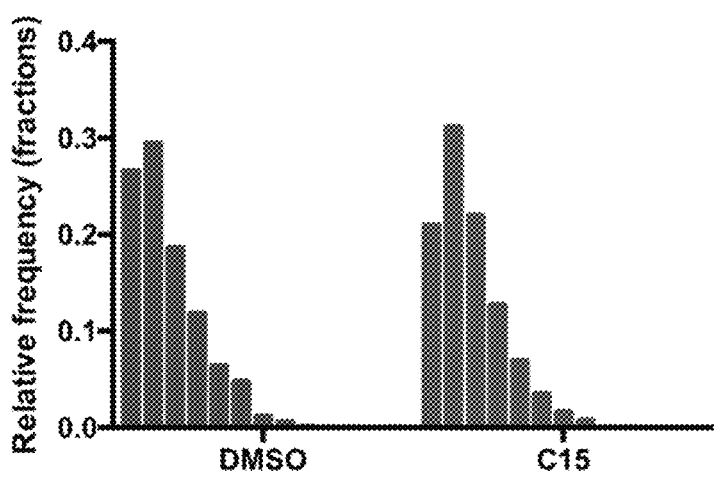
FIG. 26 is a graph of relative frequency (fractions) in function of bins of 500 μm$^2$ (myofiber cross-sectional area (CSA)) for the in vivo administration of DMSO and C15 to TA Dmd$^{mdx}$ muscle stem cells.
Figure 27:
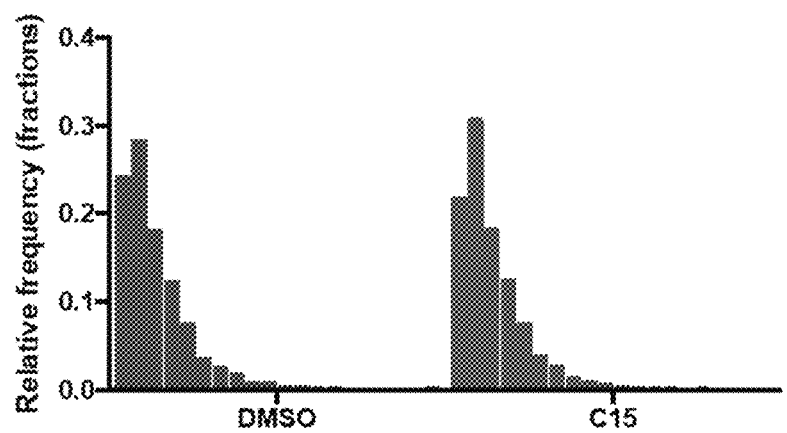
FIG. 27 is a graph of relative frequency (fractions) in function of bins of 200 μm$^2$ (myofiber cross-sectional area (CSA)) for the in vivo administration of DMSO and C15 to diaphragm Dmd$^{mdx}$ muscle stem cells.

Administration of C15 in a preclinical mouse model of Duchenne muscular dystrophy (Dmdmdx) for a period of two weeks (osmotic pumps, 2.5 mg/kg/day C15 in DMSO: PEG400) (FIG. 20), lead to the maintenance of MuSC associated RNA granules (FIG. 21A and FIG. 21B). An increased numbers of PAX7-expressing MuSCs on single extensor digitorum longus (EDL) myofibres was also observed (FIG. 22A and FIG. 22B fluorescent microscopy images and FIG. 23 quantification of fluorescent cells), as well as on transverse sections of tibialis anterior (TA) (FIG. 24 quantification of fluorescent cells) and diaphragm (FIG. 25 quantification of fluorescent cells) muscle. Moreover, myofiber cross sectional area of treated muscle was found to be increased (FIG. 25 quantification of fluorescent cells), while numbers of central nucleated myofibres, a hallmark of damaged muscle, were decreased (FIG. 26 and FIG. 27).

What is claimed is:

1. A compound of formula (I)

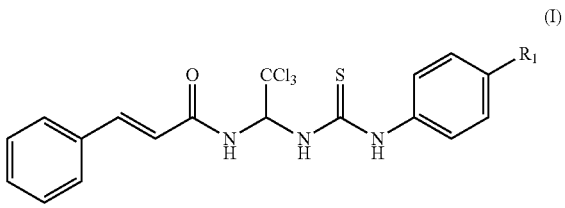

a hydrate and/or a pharmaceutical salt thereof;
wherein R$_1$ is a C$_3$-C$_8$ cycloalkyl or a tert-butyl.

2. The compound of claim 1, wherein the C$_3$-C$_8$ cycloalkyl is a C$_3$-C$_6$ cycloalkyl.

3. The compound of claim 1, wherein the C$_3$-C$_8$ cycloalkyl is a C$_3$-C$_5$ cycloalkyl.

4. The compound of claim 1, wherein the compound is of formula (Ia)

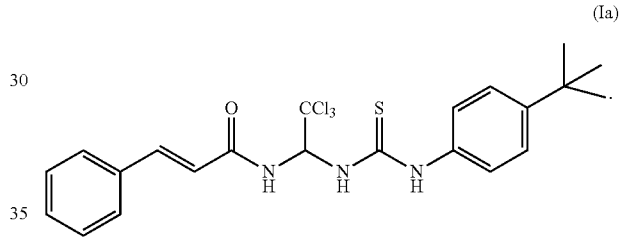

5. A composition comprising the compound of claim 1 and a pharmaceutically acceptable excipient.

6. A composition comprising the compound of claim 1 and a cell culture medium.

7. A method of treating a degenerative disease that has a stem cell quiescence regulation affected or mediated by the phosphorylation of eIF2α, said method comprising administering a therapeutically effective amount of the compound of claim 1 to a subject in need thereof.

8. A method of treating a degenerative disease that has a stem cell quiescence regulation affected or mediated by the phosphorylation of eIF2α, said method comprising administering a therapeutically effective amount of the composition of claim 5 to a subject in need thereof.

9. A method of treating a degenerative disease that has a stem cell quiescence regulation affected or mediated by the phosphorylation of eIF2α, said method comprising expanding a stem cell population from a subject with the compound of claim 1, and grafting a therapeutically effective amount of the stem cell population into the subject.

10. A method of treating a degenerative disease that has a stem cell quiescence regulation affected or mediated by the phosphorylation of eIF2α, said method comprising expanding a stem cell population from a subject with the composition of claim 5, and grafting a therapeutically effective amount of the stem cell population into the subject.

11. A method of treating a degenerative disease that has a stem cell quiescence regulation affected or mediated by the phosphorylation of eIF2α, said method comprising expanding a stem cell population from a subject with the composition of claim 6, and grafting a therapeutically effective amount of the stem cell population into the subject.

12. The method of claim 7, wherein the degenerative disease is a muscular degenerative disease.

13. The method of claim 12, wherein the muscular degenerative disease is muscular dystrophy, cachexia or sarcopenia.

14. The method of claim 13, wherein the muscular dystrophy is Duchenne muscular dystrophy, Becker muscular dystrophy, a myotonic muscular dystrophy, a facioscapulohumeral muscular dystrophy (FSHD), a congenital muscular dystrophy, or a limb-girdle muscular dystrophy.

15. A method of expanding a satellite cell population in vivo comprising using the compound of claim 1.

16. A method of expanding a satellite cell population in vivo comprising using the composition of claim 5.

17. A method of expanding a satellite cell population ex vivo comprising using the compound of claim 1.

18. A method of expanding a satellite cell population ex vivo comprising using the composition of claim 5.

19. A method of expanding a satellite cell population ex vivo comprising using the composition of claim 6.

* * * * *